United States Patent Office 3,035,944

Patented May 22, 1962

3,035,944

ELECTRICAL COMPONENT PREPARATION UTILIZING A PRE-ACID TREATMENT FOLLOWED BY CHEMICAL METAL DEPOSITION

Ben C. Sher, 6175 N. Wolcott Ave., Chicago, Ill., and Hal F. Fruth, 5032 Morse Ave., Skokie, Ill.

No Drawing. Filed Aug. 5, 1960, Ser. No. 47,581
7 Claims. (Cl. 117—213)

Our invention is directed to a new and useful method of making printed circuits, capacitors and other electrical components comprising ceramic and synthetic plastic insulating bodies on which conductive coatings, particularly copper coatings, are deposited on selective areas to form current conductors, plates or terminals for the electrical components involved. This application is a continuation of application Serial No. 458,291, filed September 24, 1954, and now abandoned.

The invention is of particular value in the production of electrical components having copper coatings on such nonmetallic surfaces as solid ceramic bodies of the type of titanium dioxide; alkaline earth titanates and ziraconates, exemplified particularly by barium titanate, barium ziraconate, strontium titanate and calcium titanate, or with or without additions of minor portions of such materials as oxides of tin, lead, lanthanum and the like; Alundum, plastic-bonded micas, glass-bonded mica and high dielectric materials of the ceramic and allied types. It is also of value in the production of copper coatings on non-metallic solid bodies such as synthetic resins and plastics exemplified by cellulose acetate, cellulose propionate, cellulose butyrate, cellulose aceto-butyrate, methyl and other alkyl acrylates and methacrylates typical of which is "Lucite"; melamine resins, nylon, phenolic resins such as phenol-formaldehyde resins, ureaformaldehyde resins, and the like.

The production of electrical components having insulating bodies with selected areas of copper thereover is a well known and developed art. Sometimes the conductive copper areas are provided by laminating a copper sheet to a base of insulating material and then etching away copper in those areas where the conductor material is not desired. Other procedures utilize special electrical plating operations or photographic or photoengraving techniques. In all of such cases, at least one of the main desiderata has been the formation of a copper coating which, in subsequent fabrication operations as well as in ultimate use, will satisfactorily adhere to the aforesaid non-metallic bodies. Despite the wide variety of procedures which have been suggested in an effort to form satisfactory copper coatings on the aforesaid insulating bodies, at least most of the heretofore known procedures have suffered one or more serious objections which have militated against the widespread commercial adoption and use of such procedures. Either the methods were cumbersome or costly, or both, or, in actual practice on a commercial scale, they proved to be less than adequately desirable so far as the adherence and nature of the metallic coatings was concerned.

Deposition of silver and copper coatings on glass in the making of mirrors is also a long known and well developed art. The problems involved in making mirrors, however, are quite different from those involved in the fabrication of electrical components. For example, many of the techniques involved in the making of mirrors are for the purpose of obtaining mirrored surfaces of the desired clarity and color which objectives are obviously not involved in the fabrication of electrical circuit components. Thus, it is most common in the making of silver mirrors to deposit metallic silver on a polished glass surface by immersing the glass in or otherwise applying a relatively thick layer of a silver salt solution thereupon, and then reducing the silver salt solution by adding a reducing agent to the relatively thick layer or body of silver salt solution remaining on or surrounding the glass involved. This produces a thick continuous silver layer. In some instances, the metallic silver is protected by the application of a layer of copper over the silver. The resultant copper and silver coated glass body, however, is of little value in the electrical component art. In the first place, glass does not have the physical characteristics normally desired of the insulating bases or bodies of printed circuits, capacitors and other electrical components. In the second place, the bond strength of the copper is too weak to withstand the rigorous treatment involved in the manufacturing and use of the electrical components.

In the fabrication of copper colored mirrors a thin layer of silver is sometimes deposited on the surface to be mirrored before application of the copper layer to obtain the desired copper tone which may vary between a bright copper to a silver tone. There has been no appreciation or use, however, of these techniques involving the use of thinly silvered undercoatings for the copper in making electrical circuit components where the objective of providing brightly mirrored surfaces of a desired tone is obviously not involved.

As will appear below, in accordance with our invention, certain practices heretofore thought only desirable in the making of copper colored mirrored surfaces have, in part, been applied to the fabrication of electrical circuit components wherein copper is selectively applied to ceramic or synthetic plastic insulating bodies. Additionally, the present invention utilizes techniques which are unique even in the field of mirror making to effect highly improved copper adherence characteristics on the insulating bodies of the electrical components involved, so that the copper coatings maintain their integrity over long periods of time during, for instance, the rigorous treatment incident to the fabrication of the components themselves and in their assembly and use with other components forming the ultimate electrical products involved.

In accordance with the present invention, we have obtained unexpectedly strong adherence between highly conductive layers of copper and the ceramic and resinous and synthetic plastic insulating bodies of electrical components by applying an exceedingly thin, discontinuous noble metal undercoating, preferably silver, to the surfaces of the insulating bodies prior to copperizing and by a method involving the initial imparting of ion-exchange properties to the insulating bodies prior to application of the silver thereto. The silver is applied by first immersing the insulating bodies in a weak noble metal salt solution and then immersing the same in a reducing solution. The withdrawal of the insulating body from the noble metal salt solution before immersion in the reducing solution naturally results in draining of the noble metal salt solution therefrom. The reduction step results in a very thin adherent deposit or film of noble metal (of insufficient thickness to form a useful mirror), in fact, so thin that the noble metal layer is actually discontinuous and offers such a high resistance as to act as an insulator relative to the conductive areas of copper later to be applied. It has been found that such thin, discontinuous films of noble metal unexpectedly form better adherent surfaces for the copper than thick continuous layers of noble metal, and the initial ion-exchange properties imparted to the insulating bodies, among other things, ensures a strong intimate bond between the small deposits of noble metal and the insulating bodies.

One way in which ion-exchange properties can advantageously be effected is through the treatment of the surface of the non-metallic bodies, preferably after washing if necessary, with a suitable acid solution. Strong solutions of sulfuric acid, as, for example, solutions of the order of 60% to 70% sulfuric acid up to concentrated sulfuric acid, and even strong sulfuric acids such as fuming sulfuric acid, can effectively be utilized for this purpose. other acids, such as phosphoric acid, in strong concentrations, can also be employed although not generally so satisfactorily as sulfuric acid. The treatment with the strong acid solution is most desirably effected at slightly elevated temperatures, of the order of about 40 degrees C. to 90 degrees C., and the treatment requires only a few seconds to a few minutes, for example, of the order of 5 seconds to from about 2 to 6 minutes in the usual case, this being dependent somewhat upon the exact nature of the non-metallic body being treated. In the case of "Lucite," for instance, the treatment may be as short as about 5 seconds and in the case of barium titanate it may be about 2 to 3 minutes.

The aforementioned acid treatment results in a visible etching of the insulating bodies when they are initially smooth surfaces. This evidences sufficient chemical action with the insulating bodies involved to ensure that the aforesaid ion-exchange properties have been imparted to the insulating bodies. The mechanism of the ion-exchange reaction in the case of the ceramic materials referred to above (like the titanates) is simply that the acid breaks the oxygen (—O—) bonds and by hydrolysis forms —OH groups, the hydrogen portion of which can be readily replaced by the noble metal ions of the noble metal salt solution later to be applied thereto. The importance of the ion-exchange reaction is that the silver ions (or silver ion complex) can be maintained in minute but intimate association with the particles or molecules of the insulating material so that subsequent reduction in a separate reducing solution will effect reduction and intimate bonding between the resultant noble metal particles and the particles of the insulating material.

In the case of such synthetic materials, as phenolic resins, the aforesaid sulfuric acid treatment is sufficient to effect the visible etching referred to which evidences once again sufficient chemical reaction between the sulfuric acid and the organic constituents of the resins to impart ion-exchange properties thereto. The reaction of sulfuric acid on the phenolic resins is a sulfonating reaction which introduces sulfonic groups capable of ion-exchange reaction with the noble metal ions of the noble metal salt solution.

Depending upon the particular materials involved, other ion-exchange imparting materials may be utilized to effect the aforementioned etching and resulting ion-exchange imparting chemical reactions. For example, acidified sodium fluoride, hydrochloric acid, chromic acid, and caustic soda have been found effective to etch and, therefore, chemically react with various of the aforesaid ceramic and synthetic plastic insulating materials.

The increased adherence obtained by the imparting of ion-exchange properties to the insulating bodies is a chemical rather than a physical phenomenon because this advantage results for insulating bodies which are initially porous or rough surfaced and for insulating bodies which are polished after the etching resulting from the ion-exchange imparting treatment.

It should be noted that in the mirror making art sulfuric acid and chromic acid have sometimes been used as a washing medium for the polished glass involved. However, these sulfuric acid and chromic acid treatments applied to glass will not effect a reaction visibly to etch the same and result in the imparting of ion-exchange properties capable of effecting the advantages of the present invention. Obviously, if these acid treatments were effective to etch the glass, the mirror making qualities of the glass would be impaired.

After the treatment with sulfuric acid or other suitable ion-exchange imparting material, the treated insulating bodies are preferably washed with water so as to eliminate any residual acid. The washed insulating bodies are then immersed in an aqueous solution of a reducible noble metal salt, such as platinic chloride, gold chloride or ammoniacal silver nitrate, especially the latter, where the aforesaid ion-exchange reaction takes place. In the case of the ammoniacal silver nitrate solution, the same may contain, for instance, from about 0.2% and less to about 10% of silver nitrate (the lower amounts being preferred), and an excess of ammonium hydroxide, a suitable ammoniacal silver nitrate solution containing about 0.5% silver nitrate and about 2% ammonium hydroxide. Exceptionally good results are obtained with silver salt solutions as low as 0.05%. The treatment with the reducible noble metal salt solution requires only a short time, for instance, from about 1 to about 3 minutes, although it will be understood, of course, that this time may be varied. Removal of the insulating bodies thereby treated from the aforesaid weak solution of noble metal salt will result in drainage of the solution from the surface thereof, and subsequent reduction of the remaining noble metal ions chemically bonded to the insulating bodies inherently results in a noble metal layer of such thinness that the film is discontinuous.

As previously indicated, the resulting insulating bodies are then subjected to contact, preferably by immersion, with a reducing solution whereby to reduce the reducible noble metal salt to effect deposition of a thin film of discontinuous noble metal, especially silver, on the surface of the non-metallic body. At the preferred lower ranges of concentration of the noble metal salt solution, the noble metal film is so thin that it is substantially invisible to the naked eye. If desired, prior to immersion in the reducing solution, the insulating bodies can be washed in water since the useful silver is already chemically bonded to the insulating material. We have obtained good results by utilizing as the reducing solution a dilute solution of formaldehyde, for instance, one containing from about 1% to about 15% formaldehyde, preferably about 4%; but particularly desirable for use in the practice of our invention is a reducing solution comprising an approximately 0.5% to 3% hydrazine hydrate solution, for instance, an approximately 1% solution.

The resulting silver or other noble metal coated insulating bodies are then treated to lay down a continuous deposit or coating thereof of copper in those areas where a current conductor is desired. This may be accomplished in a number of ways, but we have found it to be particularly desirable, in the environment in which our process is carried out, to effect the deposition of a copper coating on the silver by immersing the weakly silvered insulating bodies in an alkaline copper tartrate solution. Such alkaline copper tartrate solution may contain from about 1% to about 5% copper tartrate (calculated as $$CuSO_4.5H_2O)$$

Thicknesses of copper, for instance, to the extent of 2 or 3 to about 5 mils, are thus rapidly effected. After the copper or other non-noble metal coating has thus been deposited, said coated non-metallic body may, if desired, be washed, and additional coatings of copper or other metals can readily be deposited by means of electroplating procedures.

An alternative is to contact the insulating bodies with the reducible noble metal salt solution, as previously described, and then contact said bodies, by immersion or otherwise, with alkaline copper tartrate solution to which from about 1% to about 15% formaldehyde has previously been added. In other words, in this specific example, a separate or independent reduction of the noble metal salt is not effected. Rather, the reduction of the noble metal salt takes place in the same bath or the like in which the copper deposition occurs. In such case, nevertheless, at least in the main, the silver or other noble metal first deposits on the non-metallic body and the copper then deposits on the noble metal. This procedure results in especially satisfactory bondings of the noble metal to the non-metallic body and the copper to the noble metal.

It will, of course, be understood that, where it is desired to effect copper coatings on only limited areas of the insulating bodies, this may be accomplished by masking those surfaces thereof which it is desired should not be coated. This may be done in various ways and through the utilization of various coating materials such as mastics, asphalt, and the like.

Our process is applicable to the coating of ceramic and synthetic plastic bodies of the type above mentioned of varying shapes as, for instance, sheets, films, tubes, disks and wires, as well as fabricated parts of different configurations. After the copper coating or deposition procedues, if there are any rough copper edges or protrusions, these can readily be smoothed or removed, as the case may be, in any convenient manner. Thus, for instance, in the case of small bodies such as pellets, disks and cylinders, or the like, tumbling or ball milling until the edges of the copper have been effectively removed or smoothed to the desired degree is a highly satisfactory procedure.

The finished bodies lend themselves exceptionally well to the production of various electrical components and the copper surfaces, for instance, can readily be soldered for the making of electrical connections.

The expression "substantially chemically etches" used in some of the claims means that the chemical reaction involved is sufficient to etch a smooth polished surface of the insulating body involved to a degree which is visible to the naked eye.

What we claim as new and desired to protect by Letters Patent of the United States is:

1. A method of producing electrical components, such as printed circuits, capacitors, and the like, having current-carrying, copper-covered areas on at least one surface of an insulating body made of a ceramic material having intermolecular oxygen linkage bonds, the steps which comprise: treating said surface with a strong acid effective substantially chemically to etch and hence react with the same to break the oxygen bonds therein and attach to the broken bonds a substituent readily replaceable by a noble metal ion, then subjecting said treated surface to a weak solution of a reducible noble metal salt, the noble metal portion of which engages in an ion-exchange reaction with said substituent where the noble metal ions become chemically bonded to the insulating body, then removing excess noble metal salt from the insulating body, then contacting said surface with a reducing agent whereby to reduce the noble metal ions to metallic form to effect deposition of a thin non-conductive film of said noble metal on said surface, and then forming conductive deposits of copper on said thin film of noble metal to form current-carrying conductive areas on said insulating body.

2. A method of producing electrical components, such as printed circuits, capacitors, and the like, having current-carrying, copper-covered areas on at least one surface of an insulating body made of a synthetic resin material having chemical bonds which can be broken and attached to ions replaceable by noble metal ions, the steps which comprise: treating said surface with a chemical agent chemically to etch and hence react with the same to break chemical bonds therein and attach a substituent to the broken bonds which is readily replaceable by a noble metal ion, then subjecting said treated surface to a weak solution of a reducible noble metal salt, the noble metal portion of which engages in an ion-exchange reaction with the hydrogen where the noble metal ions become chemically bonded to the insulating body, then removing excess noble metal salt from the insulating body, then contacting said surface with a reducing agent whereby to reduce the noble metal ions to metallic form to effect deposition of a thin non-conductive film of said noble metal on said surface, and then forming conductive deposits of copper on said thin film of noble metal to form current-carrying conductive areas on said insulating body.

3. A method of producing electrical components, such as printed circuits, capacitors, and the like, having current-carrying, copper-covered areas on at least one surface of an insulating body having chemical bonds which can be broken and attached to ions replaceable by noble metal ions, the steps which comprise: treating said surface with a chemical agent effective substantially chemically to etch and hence react with the same to attach ions replaceable by noble metal ions, then subjecting said treated surface to a weak solution of a reducible noble metal salt, the noble metal portion of which engages in an ion-exchange reaction where the noble metal ions become chemically bonded to the insulating body, then removing excess noble metal salt from the insulating body, then contacting said surface with a reducing agent whereby to reduce the noble metal ions to metallic form to effect deposition of a thin non-conductive film of noble metal on said surface, and then forming conductive deposits of copper on said thin non-conductive film of noble metal to form current-carrying conductive areas on said insulating body.

4. A method of producing electrical components, such as printed circuits, capacitors, and the like, having current-carrying, copper-covered areas on at least one surface of an insulating body having chemical bonds which can be broken and attached to ions replaceable by noble metal ions, the steps which comprise: treating said surface with a chemical agent effective substantially chemically to etch and hence react with the same to attach ions replaceable by silver ions, then subjecting said treated surface to a weak solution of a reducible silver salt, the silver portion of which engages in an ion-exchange reaction where the silver ions become chemically bonded to the insulating body, then removing excess silver salt from the insulating body, then contacting said surface with a reducing agent whereby to reduce the silver ions to metallic form to effect deposition of a thin non-conductive film of silver on said surface, and then forming conductive deposits of copper on limited selected areas of said thin non-conductive film of silver to form insulated current-carrying conductive areas on said insulating body.

5. A method of producing electrical components, such as printed circuits, capacitors, and the like, having current-carrying, copper-covered areas on at least one surface of an insulating body having chemical bonds which can be broken and attached to ions replaceable by noble metal ions, the steps which comprise: applying a thin adherent non-conductive film of noble metal on a surface of said insulating body and then forming conductive deposits of copper on limited selected areas of said non-conductive film of noble metal to form insulated current-carrying conductive areas on said insulating body.

6. A method of producing electrical components, such as printed circuits, capacitors, and the like, having current-carrying, copper-covered areas on at least one surface of an insulating body having chemical bonds which can be broken and attached to ions replaceable by noble metal ions, the steps which comprise: treating said surface with a chemical agent effective substantially chemically to etch and hence react with the same to attach ions replaceable by noble metal ions, then subjecting said treated surface to a weak solution of a reducible noble metal salt, the noble metal portion of which engages in an ion-exchange reaction where the noble metal ions become chemically bonded to the insulating body, then removing excess noble metal salt from the insulating body, then contacting said surface with a reducing agent whereby to reduce the noble metal ions to metallic form to effect deposition of a thin non-conductive film of noble metal on said surface, and then forming conductive deposits of copper on limited selected areas of said thin non-conductive film of noble metal to form insulated current-carrying conductive areas on said insulating body.

7. The method of claim 6 wherein said insulating body is a synthetic resin.

References Cited in the file of this patent

UNITED STATES PATENTS 2,030,476 Smith ---------------- Feb. 11, 1936

OTHER REFERENCES

Wein: "Metallizing Non-Conductors," Metal Industry Publication, New York, 1945, pages 41, 42 and 56 relied on.